(12) United States Patent
Park et al.

(10) Patent No.: US 7,759,853 B2
(45) Date of Patent: Jul. 20, 2010

(54) BACKLIGHT UNIT

(75) Inventors: Dong Nyuck Park, Paju-si (KR); Shin Woo Yang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1003 days.

(21) Appl. No.: 11/455,773

(22) Filed: Jun. 20, 2006

(65) Prior Publication Data

US 2007/0096654 A1    May 3, 2007

(30) Foreign Application Priority Data

Oct. 31, 2005   (KR) .................. 10-2005-0103171

(51) Int. Cl.
*H01J 61/10*  (2006.01)
(52) U.S. Cl. ................. 313/492; 313/607; 313/234; 349/70; 349/60

(58) Field of Classification Search .............. None
See application file for complete search history.

(56) References Cited

U.S. PATENT DOCUMENTS

| | | | |
|---|---|---|---|
| 2005/0280625 A1* | 12/2005 | Yajima et al. | 345/102 |
| 2006/0044830 A1* | 3/2006 | Inoue et al. | 362/614 |
| 2007/0189024 A1* | 8/2007 | Nanbu et al. | 362/458 |

\* cited by examiner

*Primary Examiner*—Ashok Patel
(74) *Attorney, Agent, or Firm*—McKenna Long & Aldridge

(57) ABSTRACT

This relates to a backlight unit that is adaptive for reducing leakage current. A backlight unit according to an embodiment of the present invention includes: a plurality of lamps; a common electrode electrically connected to an electrode of any one of the lamps; and a lower side support that supports the common electrode and that includes a shielding part, wherein the shielding part is in between a portion of the common electrode and the electrode.

16 Claims, 5 Drawing Sheets

BACKLIGHT UNIT

This application claims the benefit of Korean Patent Application No. P2005-0103171, filed on Oct. 31, 2005, which is hereby incorporated by reference for all purposes as if fully set forth herein.

BACKGROUND OF THE INVENTION

1. Field of the Invention

The present invention relates to a liquid crystal display device, and more particularly to a backlight unit that reduces leakage current.

2. Discussion of the Related Art

Generally, a liquid crystal display devices are widely used due to its characteristics of light weight, thin profile, low power consumption, etc. As a result, the liquid crystal display device is used in office automation equipment, audio/video equipment, etc. The liquid crystal display device controls the amount of light in accordance with a signal applied to a plurality of control switches that are arranged in a matrix, thereby displaying a desired picture on a screen.

In this way, the liquid crystal display device is not a self luminous display device, thus it requires a separate light source such as a backlight.

Backlights may be classified as a direct type and an edge type in accordance with the location of a light source. The edge type backlight has a light source installed at the edge of one side of a liquid crystal display device, and the edge type backlight irradiates light from the light source to a liquid crystal display panel through a light guide panel and a plurality of optical sheets. The direct type backlight has a plurality of light sources disposed directly under the liquid crystal display device, and the direct type backlight irradiates light from the light sources to the liquid crystal display panel through a diffusion plate and a plurality of optical sheets.

Recently, the direct type backlight which has improved brightness, light uniformity and color purity versus the edge type backlight, is more often used in LCD TVs.

The direct type backlight has a side support which supports a plurality of lamps and is electrically connected to the electrode of the lamps, as shown in FIGS. 1 and 2.

Referring to FIGS. 1 to 2, the side support includes an upper side support 100 into which a plurality of lamps 106 are inserted; and a lower side support 102 which is assembled with the upper side support 100 with the lamps 106 therebetween.

The lamps 106 may be EEFL's where an external electrode 106A is formed.

The upper side support 100 includes an inclined plane that is inclined to the lamps 106, and a lamp insertion groove 104 formed at the lower end of the inclined plane.

The lower side support 102 is manufactured so that its cross section is L-shaped. At an inner side surface of the lower side support 102, a common electrode 108 is installed for supplying a drive AC voltage to an external electrode 106A of the lamps 106.

The common electrode 108 is connected to a plurality of metal clips 110 that cover the external electrode 106A of the lamp 106 and is attached to the lower side support 102 so as to face the side and bottom surfaces of the lower side support 102.

However, in the direct type backlight unit using this side support, there is a problem in that a large leakage current is generated because of a high capacitance between the common electrode 108 and the external electrode 106A of the lamp 106.

SUMMARY OF THE INVENTION

Accordingly, the present invention is directed to a backlight unit that substantially obviates one or more of the problems due to limitations and disadvantages of the related art.

An advantage of the present invention is to provide a backlight unit that for reduces leakage current.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit according to an aspect of the present invention includes: a plurality of lamps; a common electrode electrically connected to an electrode of any one of the lamps; and a lower side support that supports the common electrode and that includes a shielding part, wherein the shielding part is in between a portion of the common electrode and the electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
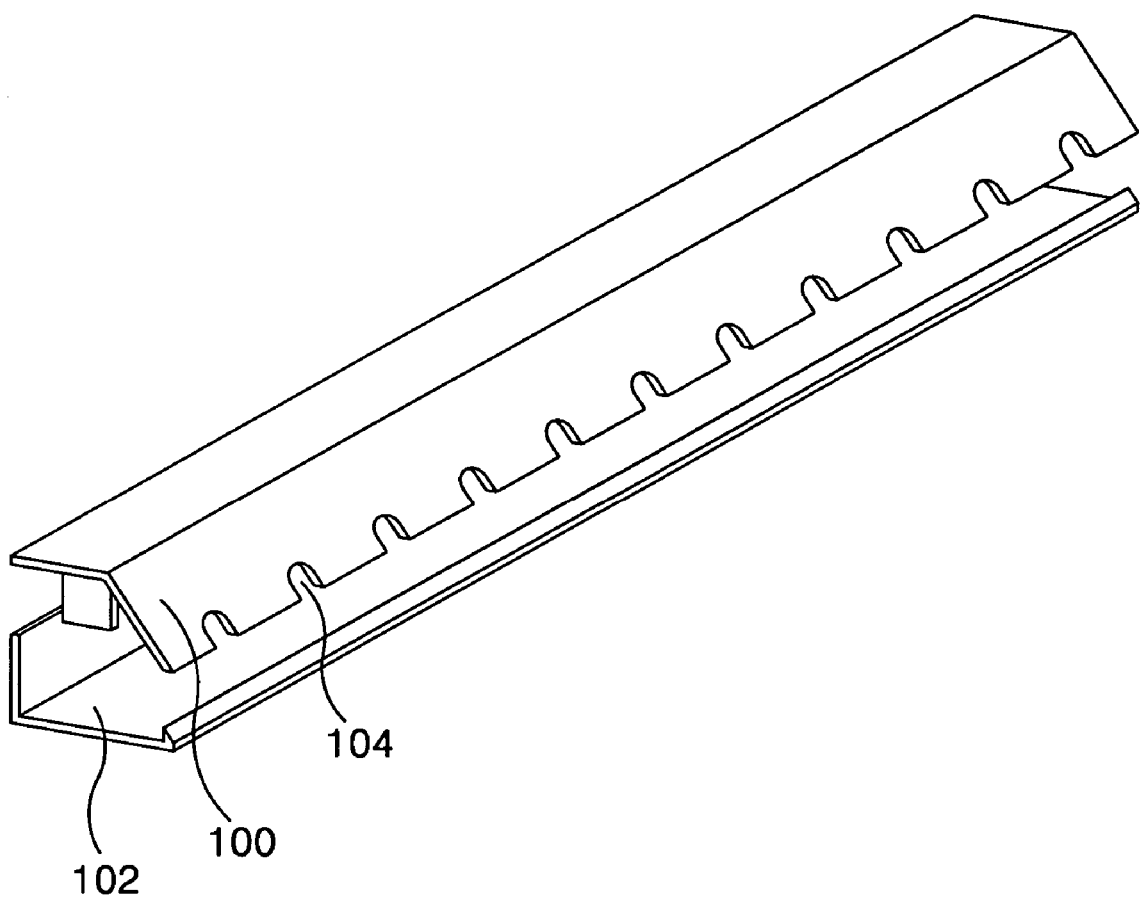
FIG. 1 is a perspective plan view briefly representing a side support device of the related art.
Figure 2:
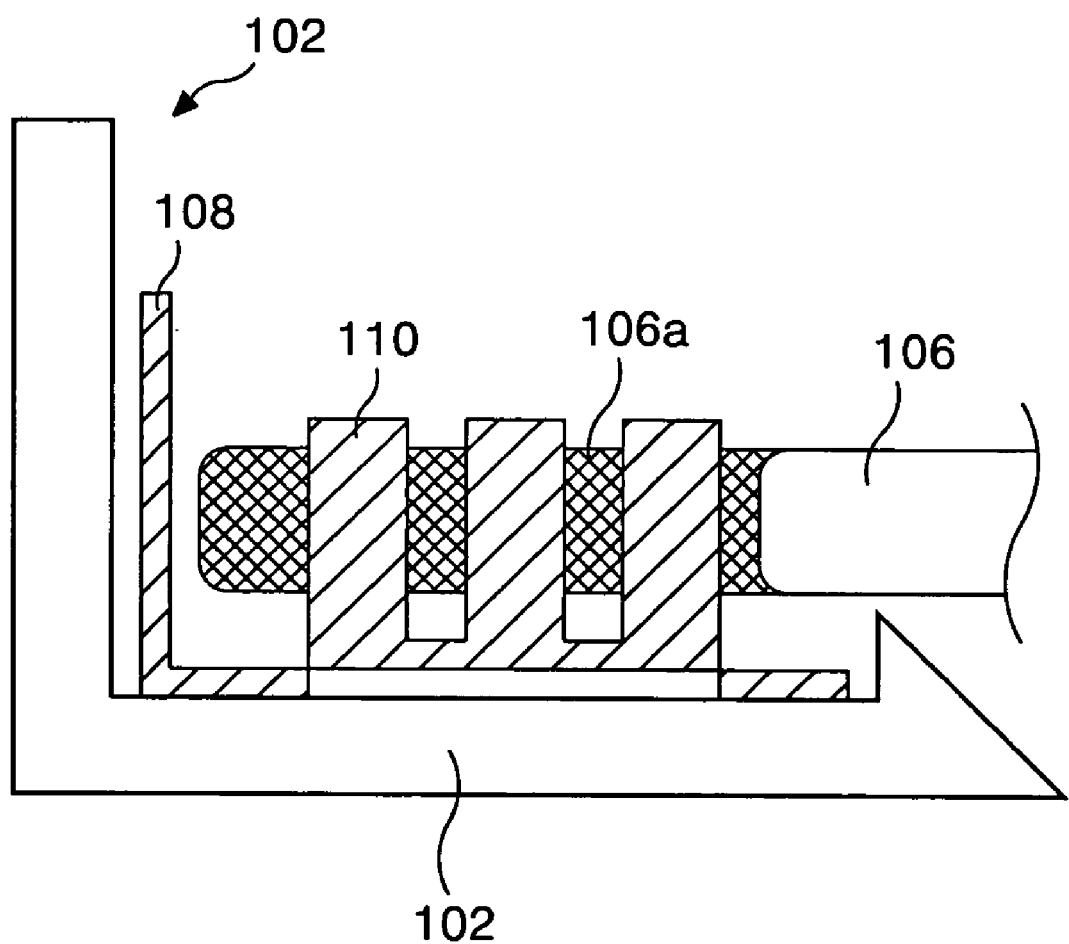
FIG. 2 is a cross sectional diagram showing an external electrode of a lamp which is inserted into a lower side support of the related art, a common electrode where clips are formed, and the clips.
Figure 3:
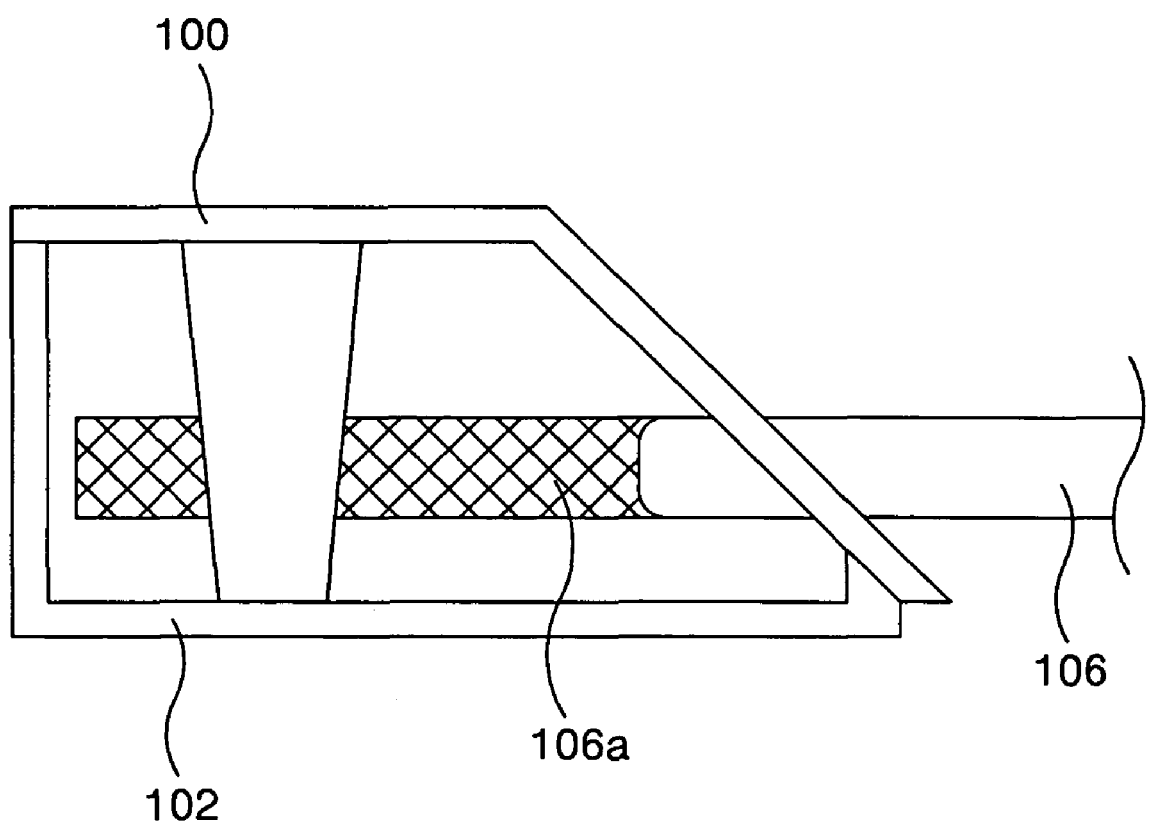
FIG. 3 is a cross sectional diagram showing that a upper side support and a lower side support are assembled in a side support device of the related art.
Figure 4:
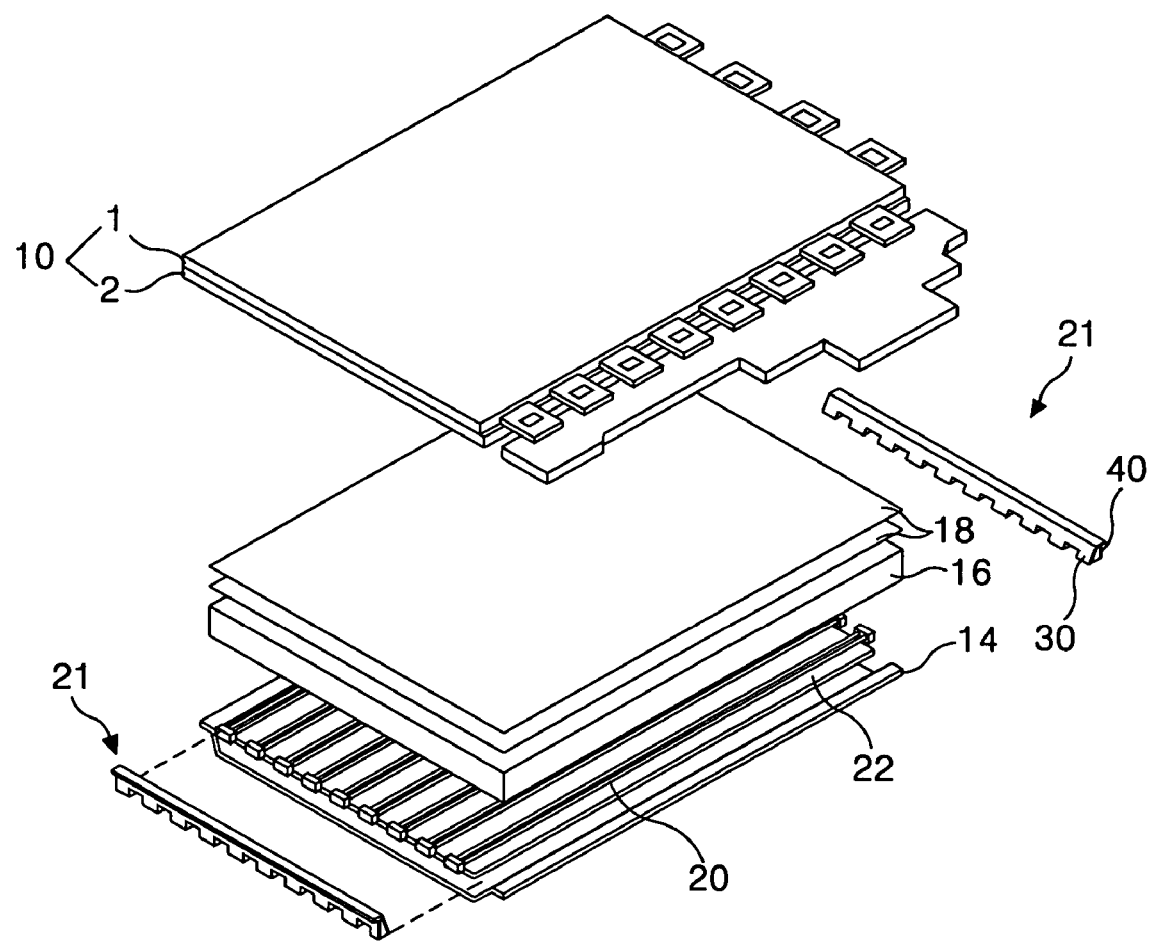
FIG. 4 is a perspective plan view representing a liquid crystal display device according to an embodiment of the present invention.
Figure 5:
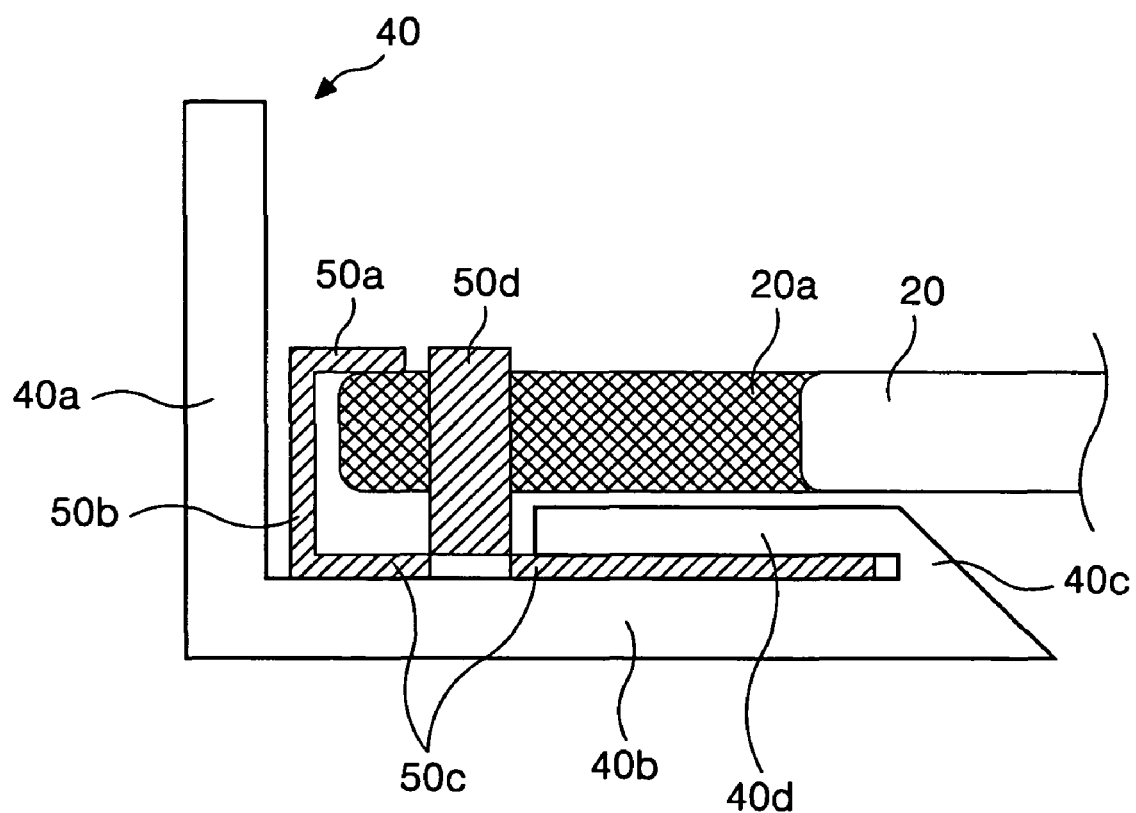
FIG. 5 is a cross sectional diagram showing a lower side support and a common electrode according to the embodiment of the present invention.

With reference to FIGS. 4 to 5, embodiments of the present invention will be explained as follows.

Referring to FIG. 4, a liquid crystal display device according to an embodiment of the present invention includes a liquid crystal display panel 10, and a direct type backlight unit that irradiates light to the liquid crystal display panel 10.

The liquid crystal display panel 100 has a liquid crystal (not shown) injected between an upper substrate 1 and a lower substrate 2. A color filter, a common electrode, a black matrix, etc are formed on the upper substrate of the liquid crystal display panel. Signal lines such as data lines and gate lines are formed on the lower substrate of the liquid crystal display panel 10, and a TFT is formed where the data line and the gate line cross. The TFT switches a data signal that is to be transmitted to a liquid crystal cell from the data line in response to a scan signal (gate pulse) from the gate line. A pixel electrode is formed in a pixel area between the data line and the gate line.

The direct type backlight unit includes: a plurality of lamps 20 that are disposed in parallel and irradiate light to the liquid crystal display panel 10; a bottom cover 14 that is disposed at the rear surface of the lamps 20 and houses the lamps 20; a reflection plate 22 attached to an inner side of the bottom cover 14 for reflecting the light from the lamps 20 toward the liquid crystal display panel 10; a side support 21 installed at both side surfaces of the bottom cover 14 for supporting both sides of the lamps 20; a diffusion plate 16 that diffuses the light incident from the lamps 20 to irradiate to the liquid crystal display panel 10; and a plurality of optical sheets 18 deposited on the diffusion plate 16.

The lamps 20 may be EEFL's (external electrode fluorescent lamp) where an external electrode 20A is formed.

The diffusion plate 16 diffuses the light incident from the lamps 20 so that the brightness across the liquid crystal display panel is uniform.

The optical sheets 18 changes the path of the light exiting from the diffusion plate 16 to be vertical to the liquid crystal display panel 10 and diffuses the light, thereby improving the efficiency of the light irradiated to the liquid crystal display panel 10 and increasing the uniformity of light. To this end, the optical sheets 18 include one or more prism sheets and one or more diffusion sheets.

The side support 21 includes a upper side support 30 and a lower side support 40 that are made by a molded material or of a non-metal material that is not conductive, e.g., plastic.

The upper side support 30 includes an inclined plane that is inclined to the lamps, and a lamp insertion groove formed in the lower end of the inclined plane. The external electrode 20A of the lamps 20 is inserted into the side support 21 through the lamp insertion groove.

The lower side support 40 is assembled with the upper side support 30 with a hollow area into which the external electrode is inserted therebetween.

The lower side support 40 includes: a bottom part 40B; a side wall part 40A extended vertically from the end of one side of the bottom part 40B; a stepped part 40C which forms a step at the end of the other side of the bottom part 40B; and a shielding part 40D extended horizontally from the stepped part 40C. There is a gap between the shielding part 40D and the bottom part 40B. The lower side support 40 supports the common electrode from below, and the common electrode supplies a drive AC voltage in common to the external electrode 20A of the lamps 20.

The common electrode includes: an upper contact part 50A that is in contact with the upper part of an end of external electrode 20A; a lower electrode 50C; a side electrode 50B vertically connected between the upper contact part 50A and the lower electrode 50C; and a metal clip 50D that is cut out or extends from the lower electrode 50C to encompass the external electrode 20A of the lamps 20.

Part of the lower electrode 50C of the common electrode is inserted between the bottom part 40B and the shielding part 40D of the lower side support 40 to be fixed therebetween.

Because there is the shielding part 40D between the lower electrode 50C of the common electrode and the external electrode of the lamps 20 and the metal clip 50D is formed as one, the area of the capacitance that exists between the common electrode and the external electrode 20A of the lamps 20 is reduced. Accordingly, the present invention results in the capacitance between the lower electrode 50C of the common electrode and the external electrode of the lamps 20 being reduced when compared with the related art, thus it is possible to reduce the leakage current flowing between the lower electrode 50C of the common electrode and the external electrode of the lamps 20.

On the other hand, the upper contact part 50A of the common electrode compensates for the problem, which results from a fact that the metal clip 50D provides only one contact area. That is to say, the upper contact part 50A of the common electrode increases the electrical contact area between the common electrode and the external electrode 20A of the lamp 20, thereby enabling the current from the common electrode to be smoothly supplied to the external electrode 20A of the lamp 20.

As described above, the backlight unit according to the present invention can reduce the leakage current that is generated in a gap between the common electrode and the external electrode of the lamp. To this end, the backlight unit of the present invention reduces the number of the common electrode clips connected to the external electrodes of the lamps to one and shields the lower common electrode that faces the bottom surface of the lower side support with the lower side support.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight unit, comprising:
   a plurality of lamps;
   a common electrode electrically connected to an external electrode of any one of the lamps; and
   a lower side support that supports the common electrode and that includes a shielding part, wherein the shielding part is in between a portion of the common electrode and the external electrode.

2. The backlight unit according to claim 1, wherein the common electrode includes:
   an upper contact part in contact with an upper part of an end of the external electrode;
   a lower electrode installed on the lower side support; and
   a side electrode vertically connected between the upper contact part and the lower electrode.

3. The backlight unit according to claim 2, wherein the upper contact part is in surface-contact with the external electrode.

4. The backlight unit according to claim 3, wherein the lower side support includes:
   a bottom part supporting the common electrode;
   a side wall part vertically extended from an end of one side of the bottom part; and
   a stepped part forming a step at an end of the other side of the bottom part, wherein the shielding part horizontally extends from the stepped part.

5. The backlight unit according to claim 4, wherein a part of the lower electrode of the common electrode is inserted into a gap formed between the shielding part and the bottom part.

6. The backlight unit according to claim 3, wherein the common electrode further includes a metal clip that encompass the external electrode.

7. The backlight unit according to claim 6, wherein the metal clip is cut out from the lower electrode to encompass the external electrode.

8. The backlight unit according to claim 3, wherein the lower side support is one of a molded material and a non-metal material that is not conductive.

9. A liquid crystal display, comprising:
   a liquid crystal display panel; and
   a backlight unit including:
   a plurality of lamps;
   a common electrode electrically connected to an external electrode of any one of the lamps; and
   a lower side support that supports the common electrode and that includes a shielding part, wherein the shielding part is in between a portion of the common electrode and the external electrode.

10. The backlight unit according to claim 9, wherein the common electrode includes:
    an upper contact part in contact with an upper part of an end of the external electrode;
    a lower electrode installed on the lower side support; and
    a side electrode vertically connected between the upper contact part and the lower electrode.

11. The backlight unit according to claim 10, wherein the lower side support is one of a molded material and a non-metal material that is not conductive.

12. The backlight unit according to claim 10, wherein the upper contact part is in surface-contact with the external electrode.

13. The backlight unit according to claim 10, wherein the lower side support includes:
    a bottom part supporting the common electrode;
    a side wall part vertically extended from an end of one side of the bottom part; and
    a stepped part forming a step at an end of the other side of the bottom part,
    wherein the shielding part horizontally extends from the stepped part.

14. The backlight unit according to claim 13, wherein a part of the lower electrode of the common electrode is inserted into a gap formed between the shielding part and the bottom part.

15. The backlight unit according to claim 10, wherein the common electrode further includes a metal clip that encompass the external electrode.

16. The backlight unit according to claim 15, wherein the metal clip is cut out from the lower electrode to encompass the external electrode.

* * * * *